United States Patent [19]

Hirata et al.

[11] Patent Number: 4,787,049

[45] Date of Patent: Nov. 22, 1988

[54] ADAPTIVE CONTROL APPARATUS FOR A MACHINE TOOL

[75] Inventors: Minoru Hirata, Kariya; Norimitsu Makihara, Gamagouri; Kazuo Kawai, Nagoya; Mamoru Nagasawa, Kariya, all of Japan

[73] Assignee: Toyoda Koki Kabushiki Kaisha, Kariya, Japan

[21] Appl. No.: 51,593

[22] Filed: May 20, 1987

[30] Foreign Application Priority Data

May 21, 1986 [JP] Japan ................................. 61-116472

[51] Int. Cl.⁴ ..................... G06F 15/46; G05B 13/02
[52] U.S. Cl. ............................. 364/474.15; 318/561; 318/571; 364/148; 364/474.23; 364/474.3
[58] Field of Search ................... 364/148, 167–171, 364/474, 475, 511; 318/561, 571; 408/10–12

[56] References Cited

U.S. PATENT DOCUMENTS

| | | | |
|---|---|---|---|
| 3,684,873 | 8/1972 | Meyer et al. | 364/474 |
| 3,720,135 | 3/1973 | Merner et al. | 318/571 X |
| 3,896,360 | 7/1975 | Meyer et al. | 318/571 |
| 4,078,195 | 3/1978 | Mathias et al. | 318/561 |
| 4,346,444 | 8/1982 | Schneider et al. | 364/475 |
| 4,547,847 | 10/1985 | Olig et al. | 364/148 |
| 4,584,649 | 4/1986 | Komanouri et al. | 364/475 |
| 4,698,773 | 10/1987 | Jeppsson | 364/474 |

*Primary Examiner*—Joseph Ruggiero
*Attorney, Agent, or Firm*—Oblon, Fisher, Spivak, McClelland & Maier

[57] ABSTRACT

An adaptive control apparatus is provided with a load detector for detecting a load which acts on a cutting tool during a machining operation of a workpiece and plural storage areas for one cutting tool which respectively store plural data groups of load values which are sampled during respective model machining operations. In an adaptive control machining operation, a microprocessor selects one of the plural storage areas when receiving tool code data that a numerical controller reads out in accordance with a numerical control program. In the adaptive control machining operation controlled by the numerical controller in accordance with the numerical control program, the microprocessor modulates the feed rate override of the numerical controller so that the feed rate of the cutting tool is varied to make the actual machining load detected during the adaptive control machining operation follow the sampled load values which are successively read out from the selected one of the storage areas.

4 Claims, 8 Drawing Sheets

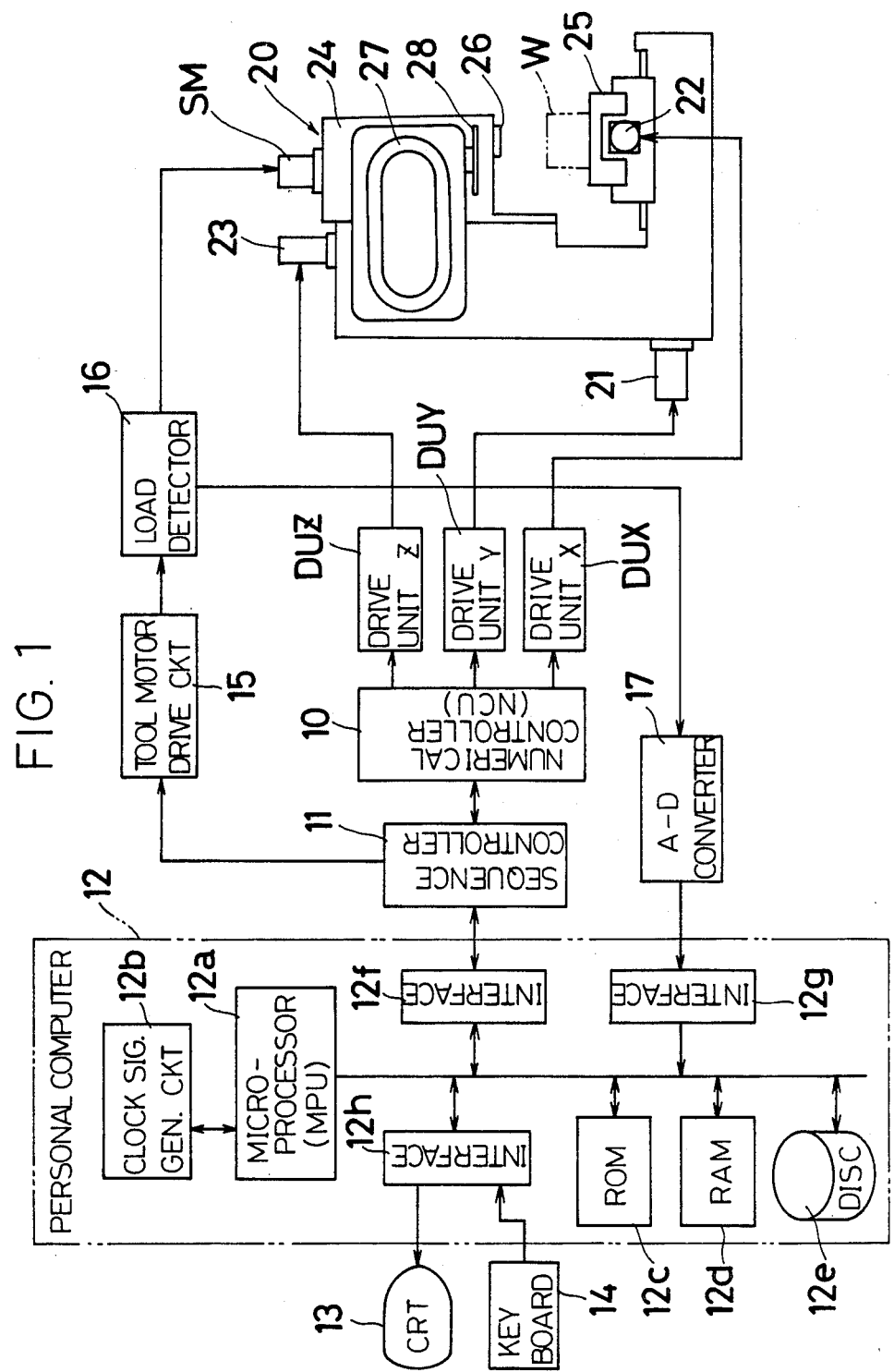

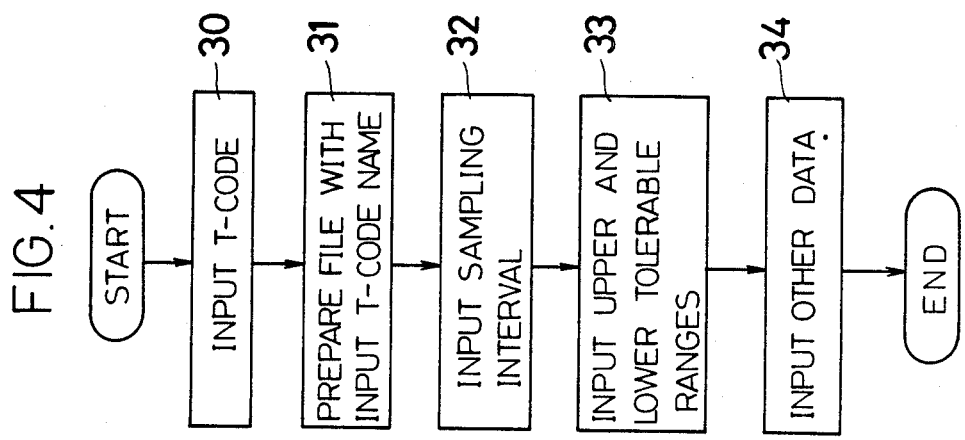
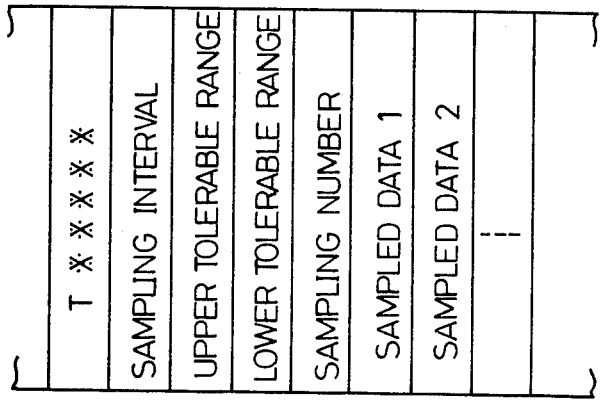

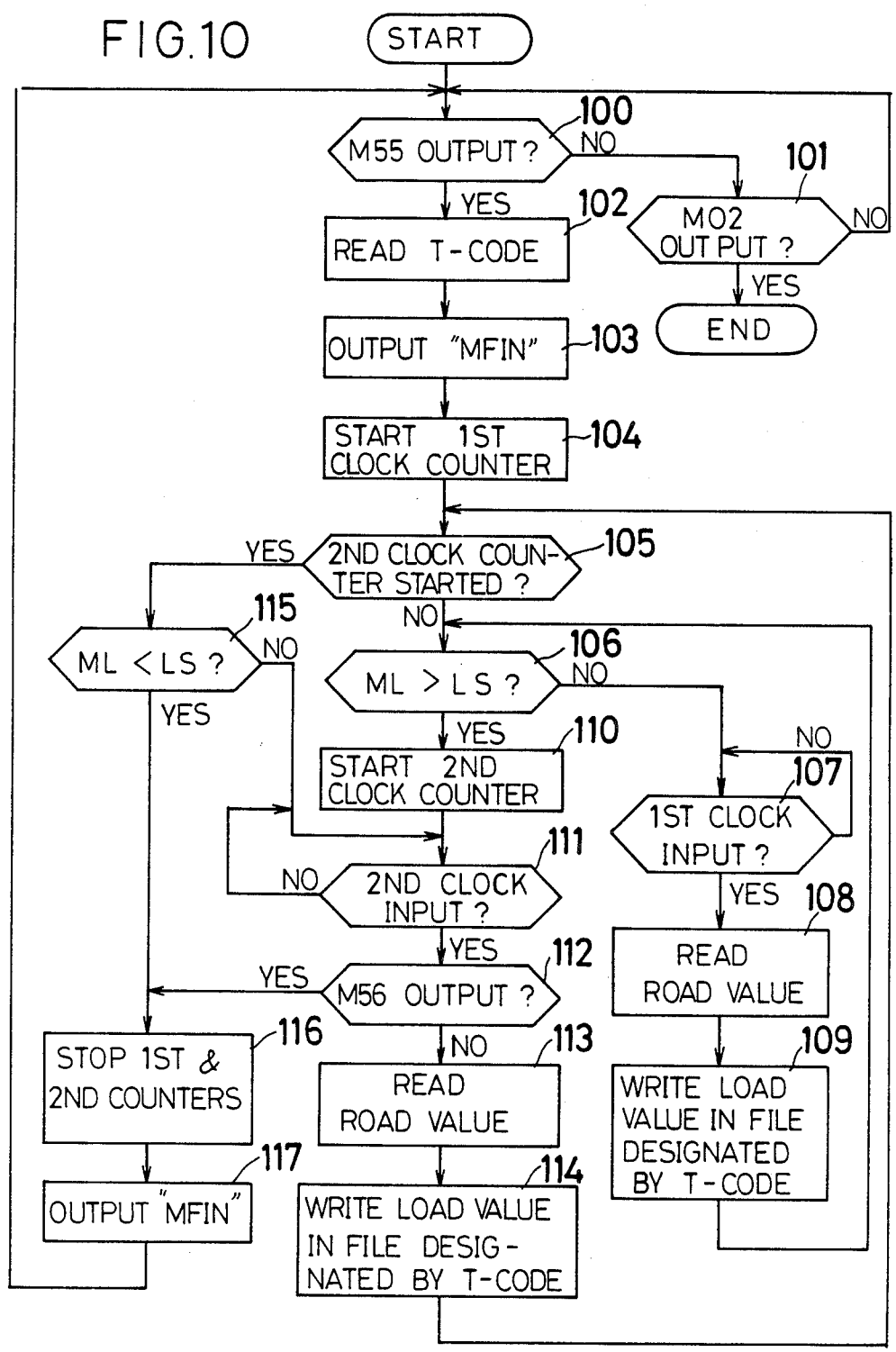

ADAPTIVE CONTROL APPARATUS FOR A MACHINE TOOL

BACKGROUND OF THE INVENTION

1. Field of the Invention

The present invention relates in general to a control system for a machine tool and more particularly, to an adaptive control apparatus for controlling the feed rate of a tool based on a machining load which acts on the tool during a machining operation.

2. Discussion of the Prior Art

In recent years, in order to machine a workpiece under an optimum condition, there has been used in a numerical control machine tool an adaptive control apparatus capable of controlling the feed rate of a cutting tool based on the variation in the load acting on the tool. In such an adaptive control apparatus, storage areas each for storing numerous load values sampled during a model machining operation are respectively provided for tools used therein, and the variation in the load during each model machining operation using a tool is sampled to be stored in one of the storage areas allocated to the tool. During an adaptive control machining operation, load values stored in the storage area allocated to the tool which is designated by a T-code included in a numerical control data block are successively read out, and the feed rate of the tool is controlled so that the load detected during the adaptive control machining operation follows the load value selectively read out from the storage area.

As aforementioned, in the prior art adaptive control apparatus, only one storage area is provided for one tool for storing load values sampled during a model machining operation. This disadvantageously makes it impossible to sample load values during a number of model machining operation wherein the same tool is used under different machining conditions, so as to perform adaptive control using an optimum one of the plural sampled data groups. The provision of only one storage are for one tool also disadvantageously makes it impossible to store plural groups of sampled data regarding the same cutting tool and then, to perform adaptive control machining operations on plural portions of a workpiece using the same tool based on the different sampled data groups.

SUMMARY OF THE INVENTION

Accordingly, it is a primary object of the present invention to provide an improved adaptive control apparatus capable of selectively using plural sampled data groups which have been gathered for one tool in plural model machining operations which are different in machining condition or in portions to be machined on a workpiece.

Briefly, in an adaptive control apparatus according to the present invention, there is provided a load detector for detecting a machining load which acts on at least one of a tool carrier and a work table during a machining operation. Plural data storage areas are provided for respectively storing plural groups of load value data, in connection with the kinds of a tool and a machining operation designated by a data input device. Each of the plural groups of load value data includes numerous load values successively sampled during a model machining operation. Selection means identifies the kinds of the tool used and the machining performed in accordance with a numerical control program during an adaptive control machining operation, so as to select from the plural groups one group which has been gathered for the identified tool and the identified kind of a machining operation. Objective load read-out means successively reads out from the storage area for the selected data group load values which correspond to the progress of the adaptive control machining operation. Feed rate control means controls the feed rate in the relative movement between the tool carrier and the work table so as to make the machining load detected by the load detector follow the load values read out by the objective load read-out means.

With this configuration, plural groups of sampled load data are gathered for one tool to be stored in plural data storage areas during respective model machining operations and are selectively used in adaptive control machining operations. Thus, where the plural groups of sampled load data are those gathered during plural model machining operations which have been performed on the same machining portions of the same workpieces using the same tool under different machining conditions, the adaptive control machining operation can be performed using an optimum one of the sampled load data groups. Where the plural groups of sampled load data are those gathered during plural model machining operations which have been performed using the same tool on different machining portions on a workpiece, adaptive control machining operations can be performed for all of the different workpiece portions. Accordingly, the present invention is able to enhance the flexibility of the adaptive control machining operation.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of the preferred embodiments when considered in connection with the accompanying drawings, wherein like reference numerals designate identical or corresponding parts throughout the several views, and in which:

FIG. 1 is a schematic elevational view of a machine tool, also showing in the form of block diagram a control system including a numerical controller, a sequence controller and an adaptive control apparatus according to the present invention;

FIG. 2 is an explanatory view showing load data files prepared in a hard disc shown in FIG. 1;

FIG. 3 is an explanatory view showing the detailed memory allocation in each of the load data files shown in FIG. 2;

FIG. 4 is a flow chart of a file preparation routine executed by a microprocessor of the adaptive control apparatus shown in Figure;

FIG. 6 is an explanatory view of a numerical control program executed by the numerical controller shown in FIG. 1 in the model machining operation;

FIG. 8 is an explanatory view of another numerical control program executed by the numerical controller in the adaptive control machining operation;

FIG. 10 is a flow chart of another model machining routine executed by the microprocessor in place of that shown in FIG. 5;

DETAILED DESCRIPTION OF THE PREFERRED EMBODIMENTS

Figure 5:
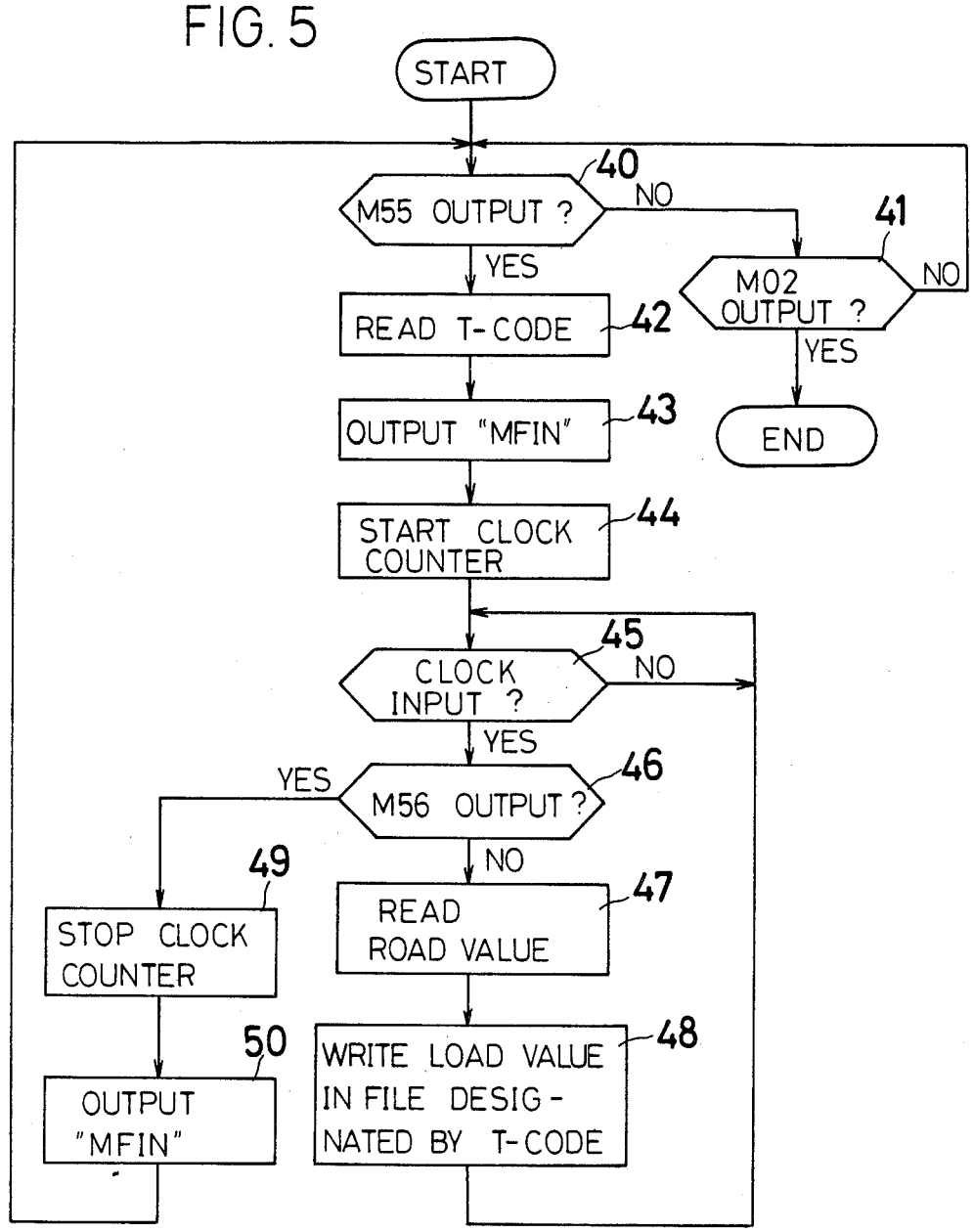
FIG. 5 is a flow chart of a model machining routine executed by the microprocessor in a model machining operation.

Referring now to the drawings and particularly to FIG. 1 thereof, 10 denotes a numerical controller (hereafter referred to as "NCU"), to which servomotor drive units DUX, DUY, DUZ and a sequence controller 11 are connected through interfaces (not shown).

A numeral 20 denotes a machine tool of the type called "machining center" which is controllable by the NCU 10, as well known in the art. The relative movement between a work table 25 for carrying a workpiece W and a spindle head 24 rotatably carrying a tool spindle 26 driven by a tool spindle motor SM is varied in three dimensional directions when servomotors 21, 22, 23 are respectively driven by the servomotor drive units DUY, DUX, DUZ. A numeral 27 denotes a tool magazine for removably storing a plurality of diverse cutting tools. With operations of a magazine indexing device (not shown) and a tool exchanger 28, the tools in the tool magazine 27 are selectively attached to the tool spindle 26 to perform machining operations on the workpiece W.

The sequence controller 11 is connected to a personal computer 12 constituting an adaptive control apparatus according to the present invention and a tool motor drive circuit 15 for controlling the rotational speed of the tool spindle motor SM. The personal computer 12 is composed primarily of a microprocessor (hereafter as "MPU") 12a, a clock signal generation circuit 12b, a read-only memory (hereafter referred to as "ROM") 12c, a random access memory (hereafter as "RAM") 12d, a hard disc unit 12e, and interfaces 12f, 12g, 12h. The interface 12h is connected to a key board 14 and a CRT display unit 13.

Between the spindle drive motor SM and the tool motor drive circuit 15, there is connected a machining load detector 16 for detecting the current applied to the tool spindle motor SM so as to output a voltage signal proportional to the detected current. The load signal output from the load detector 16 is input to the personal computer 12 through an analoque-to-digital (A-D) converter 17 and the interface 12g.

The hard disc 12e of the personal computer 12 is formed as data files with a plurality of storage areas CDF1–CDF99 for storing sampled load values, as shown in FIG. 2. Each of the storage areas CDF1–CDF99 stores a file name, a sampling interval, an upper tolerable range UR, a lower tolerable range LR, a sampling number, and sampled data, as shown in FIG. 3. Each file name is composed of "T" and a five-digit numeral successive thereto, and of the five-digit numeral, the three lower digits represent the tool number of a used tool, while the two higher digits represent a step number indicating the kind of a machining operation or step.

Model Machining Operation

In the machine tool adaptive control system as constructed above, when a model machining operation is to be performed to collect load value data, the operator selects a file preparation routine or program for data collection in accordance with a menu being displayed by the CRT display unit 13.

Thus, the MPU 12a of the personal computer 12 executes the program shown in FIG. 4. Upon execution of this program, the MPU 12a first of all instructs on a screen of the CRT display unit 13 that a five-digit tool number inclusive of a step number be input, then reads the five-digit tool number when the same is key-input by the operator in response thereto (step 30), prepares the name of a file by prefixing "T" to the input five-digit numeral, and secures one of the storage areas CDF1–CDF99 of the hard disc 12e in the name of the prepared file name (step 31). Therafter, the MPU 12a instructs on the display screen that data such as a sampling interval and upper and lower tolerable ranges be input, and when these data is key-input, stores them in the prepared storage file (steps 32 through step 34). For example, in the case that model machining operations of two workpiece portions are to be performed using a No. 23 tool, two file names "T01023" and "T02023" are input to prepare two files identified thereby, whereafter the aforementioned initial data is input.

Figures 6, 8:
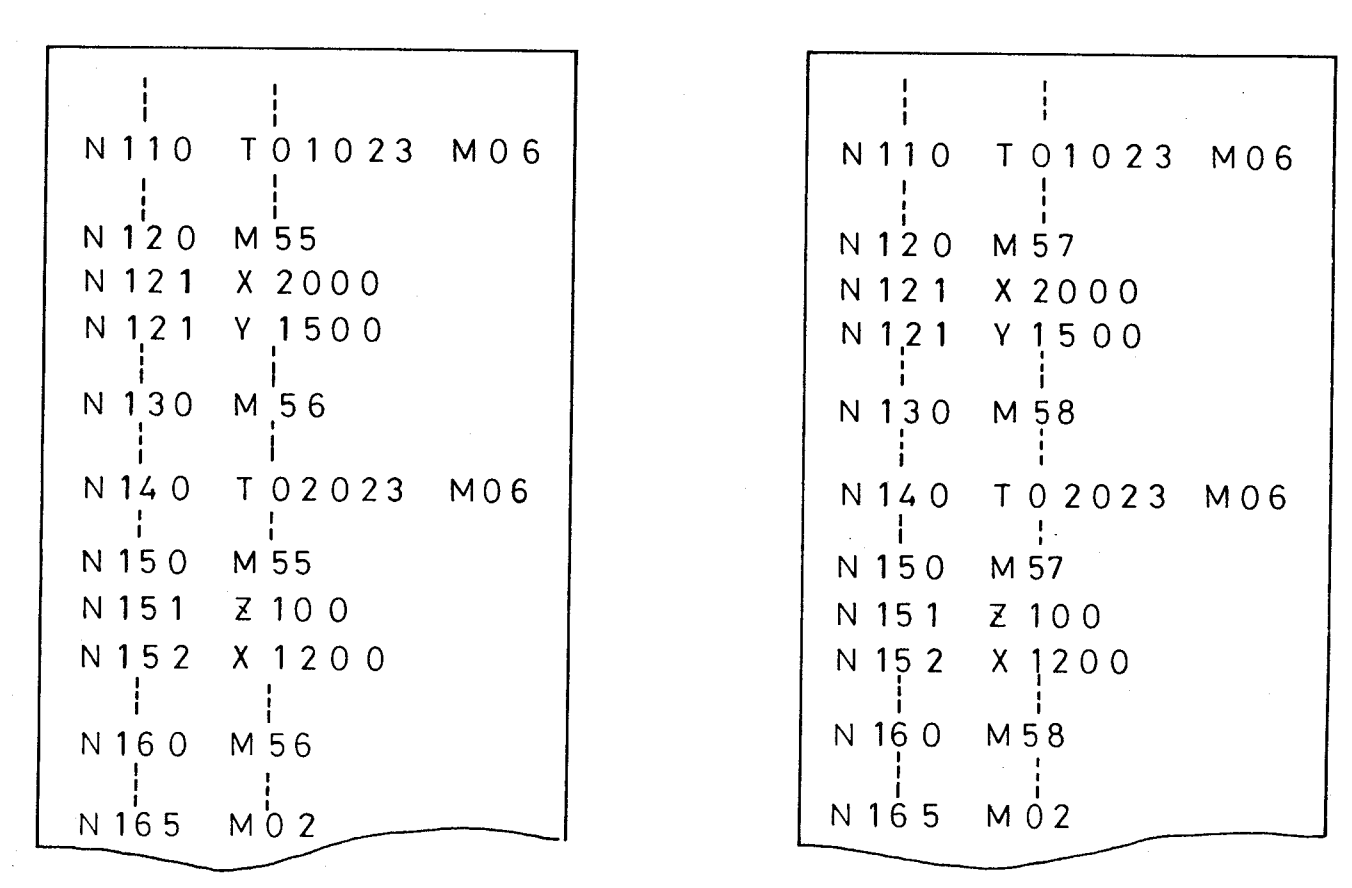

After the foregoing data input, the operator inputs to the NCU 10 a numerical control (NC) program which has been prepared to perform model machining operations using the No. 23 tool, as shown in FIG. 6, so as to make the NCU 10 ready for the model machining operations. In the NC program, "M55" is for instructing the starting of a model machining operation, while "M56" is for instructing the end of a model machining operation. Each T-code for designating a tool to be used is defined by a five-digit numeral including the aforementioned step number, and therefore, it is clear that data blocks N120–N130 define a first model machining operation using the No. 23 tool, while data blocks N150–N160 define a second model machining operation using the same tool.

Upon completion of the aforementioned preparation processings, the operator selects the menu to instruct the MPU 12a of the personal computer 12 to initiate a model machining routine shown in FIG. 5, and then, give a start command to the NCU 10 to make the same to execute the NC program shown in FIG. 6.

After starting the execution of the routine shown in FIG. 5, the MPU 12a waits until code data "M55" instructing the starting of a model machining operation is output from the NCU 10 (steps 40–41), and upon ascertaining that the M55 code data has been output, the MPU 12a reads T-code data which has been output from the sequence controller 11 to indicate the tool received in the tool spindle 26 (step 42). That is, the T-code "T01023" for the No. 23 tool being attached to the tool spindle 26 which code has been given to the sequence controller 11 upon execution by the NCU 10 of the No. 23 data block of the NC program is read into the MPU 12a in step 42.

As described above, in the illustrated embodiment, the NCU 10 constitutes data input means for inputting to the personal computer 12 information regarding a tool to be used and the kind of a machining operation to be performed.

Upon completion of this data reading, the MPU 12a outputs an M-function completion signal MFIN to the NCU 10 through the sequence controller 11 (step 43) and then, starts a clock counter (not shown) provided in the RAM 12d in step 44 to make the counter count clock signals which are generated by the clock signal generation circuit 12b at a reference time interval.

The MPU 12a further executes steps 45–48, wherein it reads a load value from the A-D converter 17 in synchronous relation with the clock signals to successively write the load value in one of the storage areas CDF1–CDF99 which bears the same file name as the read T-code. These processings are continued until the M56 code is read out from the NCU 10 upon completion of the model machining operation. As the M56 code data included in the N130 data block is output from the NCU 10, such is detected by the MPU 12a in step 46. Thus, the MPU 12a executes the processing in step 49 to discontinue the operation of the clock counter, outputs the MFIN signal in step 50, and returns to step 40.

In the illustrated embodiment, the above-described operation is performed again because the NC data for machining a second workpiece portion using the No. 23 tool is programmed in data blocks N150 through N160, as mentioned earlier. In this case, data "T02023" is programmed in block N140 as the T-code data for designating a tool to be used, and thus, those load data sampled during the second model machining operation are successively written in the storage area which has been set to bear its file name of "T02023".

Adaptive Control Machining Operation

Figure 7:
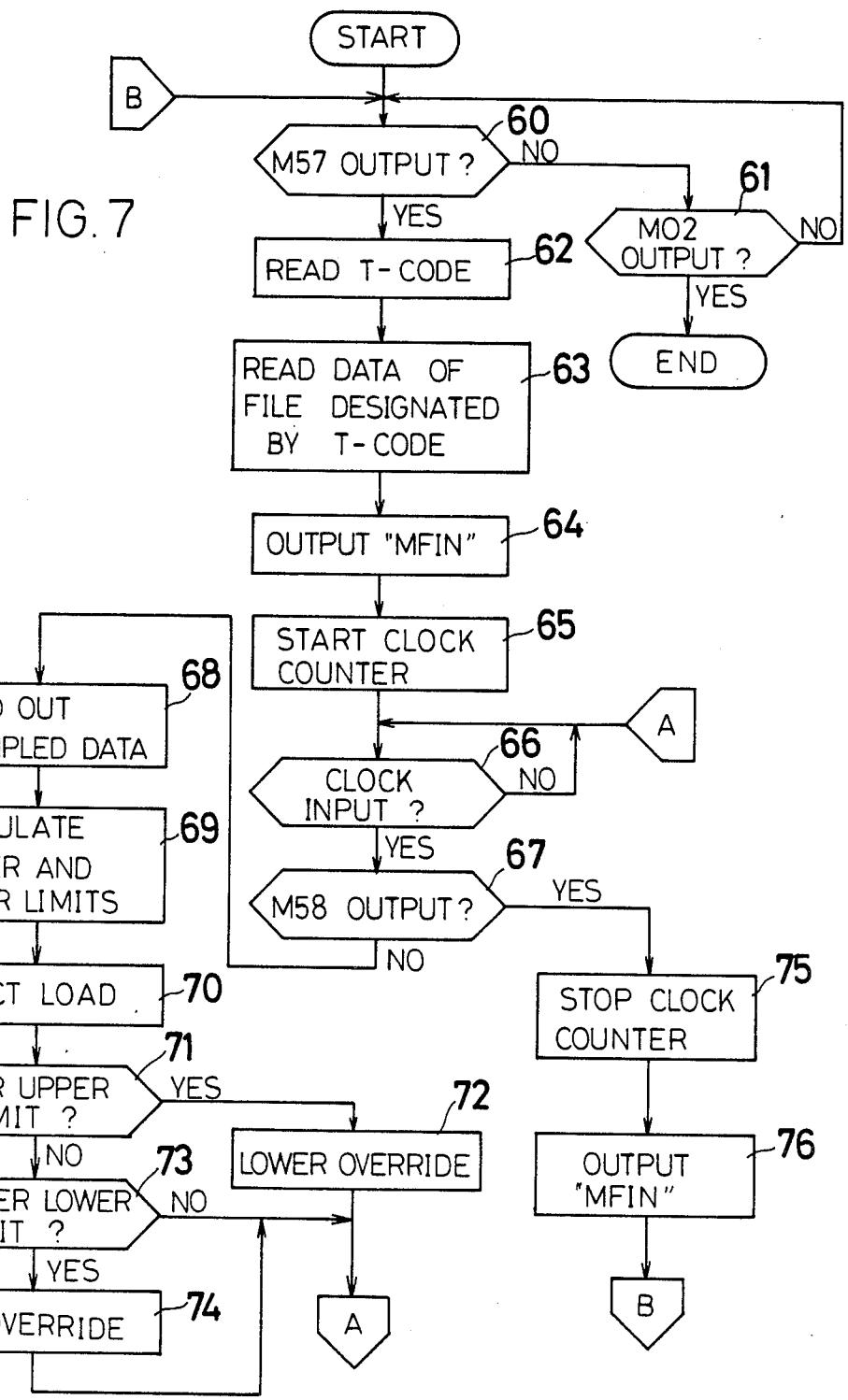
FIG. 7 is a flow chart of an adaptive control machining routine executed by the microprocessor in a adaptive control machining operation.

When an adaptive control (hereafter referred to as "AC") machining operation is to be performed, the operational mode of the personal computer 12 is switched from a model machining mode to an AC machining mode so that the MPU 12a is instructed to execute the adaptive control machining routine or program shown in FIG. 7. On the other hand, the NCU 10 is made ready for the execution of another NC program for adaptive control wherein codes "M57" and "M58" have been programmed to specify the extent within which an AC machining operation is to be performed and wherein each tool has been designated by a T-code of a five digit numeral including a step number and a tool number, as shown in FIG. 8. The NCU 10 is then started.

Upon execution by the NCU 10 of the NC program, data "M57" of the N120 data block is read out and is transmitted to the personal computer 12 by way of the sequence controller 11. The MPU 12a of the personal computer 12, upon receipt thereof, ascertains the transmitted code data "M57" in step 60 and then, moves to step 62.

When reaching step 62, the MPU 12a reads from the sequence controller 11 the T-code stored therein of the tool being received in the tool spindle 26 and in step 63, reads out from the hard disc 12e load value data in the storage area bearing the same file name as the read T-code. The MPU 12a then outputs the MFIN signal to the NCU 10 in step 64. Following this, the MPU 12a in step 65 sets the clock signal generation circuit 12b with time data corresponding to the sampling interval which has been designated at the second address of the storage area shown in FIG. 3, so as to cause the clock generation circuit 12b to output the clock signals at the designated time interval. This designated time interval is usually set to be longer than the aforementioned reference time interval. At the same time, the MPU 12a starts the operation of the clock counter.

Figure 9:
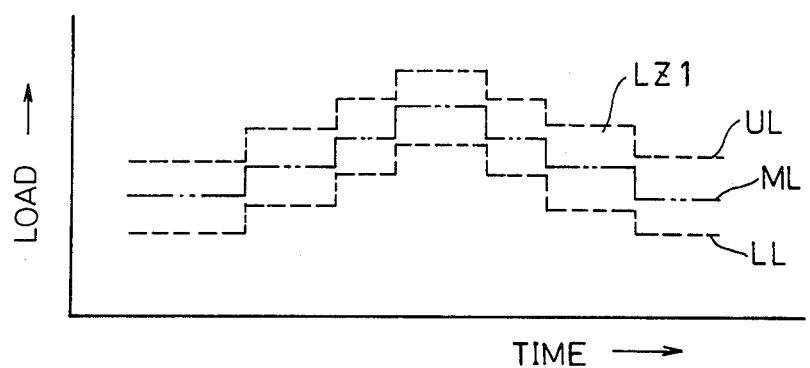
FIG. 9 is a time chart showing the characteristic of an adaptive control machining operation in the present invention.

Each time one clock signal is output from the clock signal generation circuit 12b, the MPU 12a executes the processings in steps 67–74. First of all, it is checked in step 67 whether the M58 code data for commanding the termination of an AC machining operation has been output or not. If the M58 code data has not been output, the sampled load values which respectively correspond to times expired from the starting of the AC machining operation are selectively read out from the designated data file in step 68, and upper and lower limits UL, LL are calculated by adding the plus and minus tolerable ranges UR and UL to the read-out sampled load values in step 69. Subsequently, the MPU 12a detects an actual machining load from the output of the A-D converter 17 in step 70 and increases or decreases the feed rate override so that detected machining load ML is kept between the upper and lower limits UL, LL in steps 71–74, as shown in FIG. 9. Consequently, the feed rate of the tool is controlled to keep the actual machining load ML within a load range which is varied depending on the variation in the load value sampled during the model machining operation.

The AC machining operation is performed in the above-described manner. When the M58 code data is read out by the NCU 10 to be input to the personal computer 12 through the sequence controller 11, the MPU 12a confirms such in step 67 to execute the processing for stopping the clock counter in step 75. The MPU 12a then outputs the MFIN signal in step 76 and then completes the first AC machining operation based on the sampled load data in the storage area bearing the file name "T01023", to return to step 60.

When a second AC machining operation using the same No. 23 tool is thereafter executed in accordance with those programmed in data blocks N150 through N160, the sampled load data being stored in the storage area designated by the file name "T02023" is selected in step 63 because T-code "T02023" is programmed in the data block N140. Consequently, the second AC machining operation is performed in accordance with the load values which are successively read out from the storage area bearing the file name of "T02023".

Although in the above-described embodiment, the model machining operation of two workpiece portions using the No. 23 tool are performed to sample two groups of machining load value data and the two groups of machining load data are respectively registered in the separate files, there may be performed plural model machining operations on the same or single workpiece portion under different machining conditions, and plural groups of sampled load values may be respectively registered in different files. In that case, one of the load data files which is considered to be optimum may be selected by T-code data for use in the subsequent adaptive control machining operation on the single workpiece portion.

Figure 12:
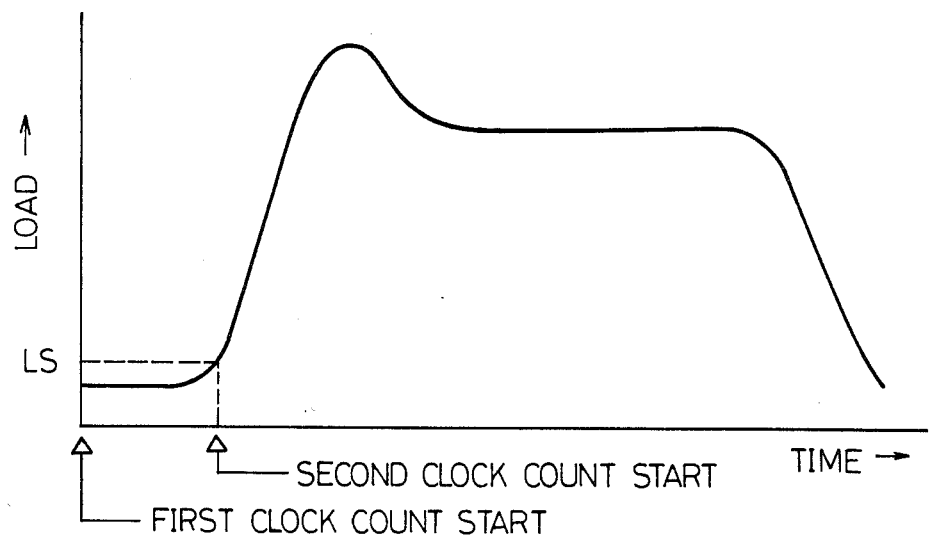
FIG. 12 is a time chart showing an adaptive control characteristic in the system according to the present invention.

A second embodiment of the present invention will be described hereinafter with reference to FIGS. 10–12. In the second embodiment, the NC program shown in FIG. 6 is used not only for the model machining operation, but also for the AC machining operation, thereby making any additional NC program such as shown in FIG. 8 unnecessary. Further, the second embodiment is improved in that the AC machining operation can be started when the detected load value ML reaches a threshold value LS which may be arbitrarily set by the operator.

Figure 11:
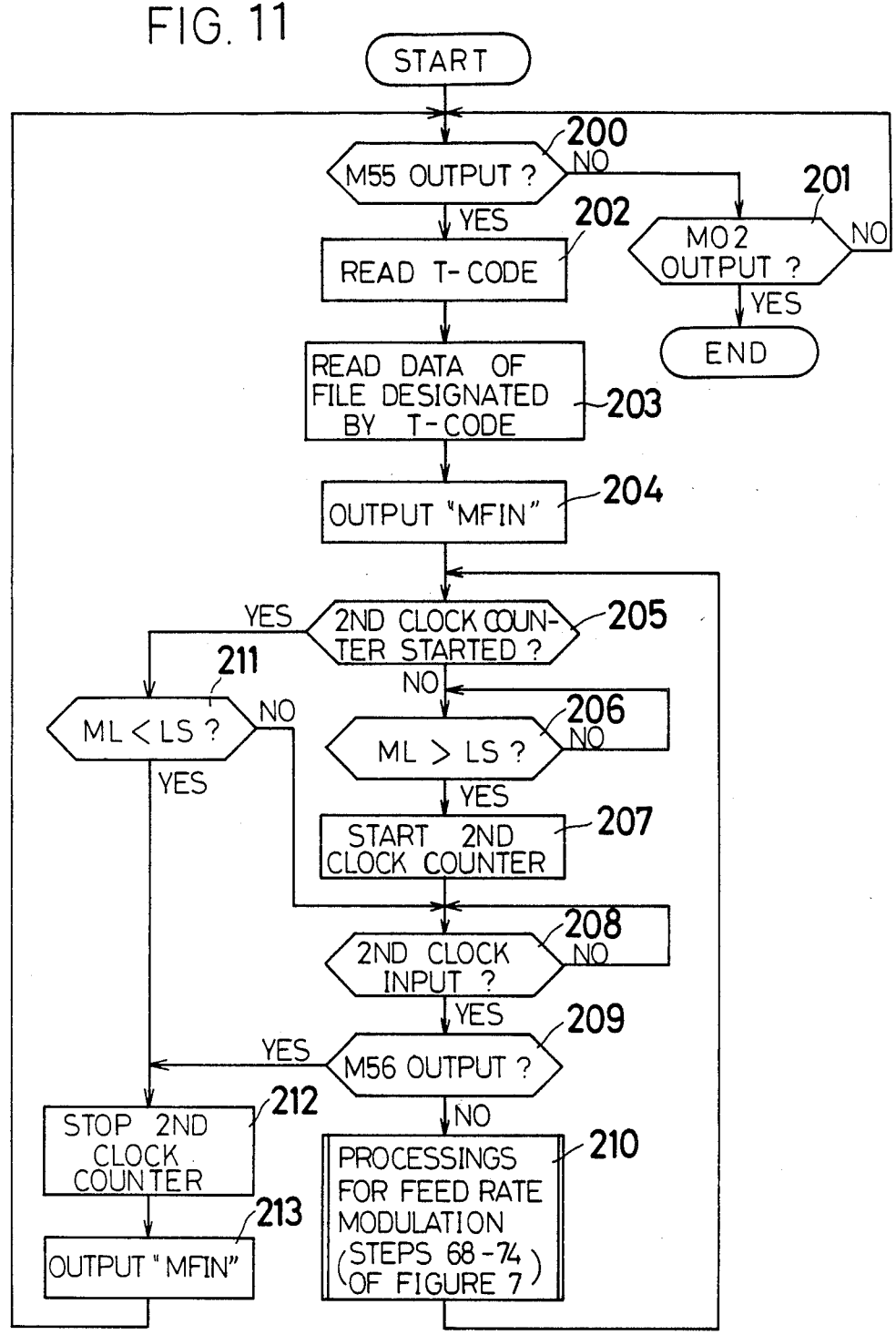
FIG. 11 is a flow chart of another adaptive control machining routine executed by the microprocessor in place of that shown in FIG. 7.

More specifically, the MPU 12a executes processings illustrated in FIG. 10 in place of those illustrated in FIG. 5 during the model machining operation, while it executes processings illustrated in FIG. 11 in place of those in FIG. 7 during the AC machining operation. Upon receiving M55 code data in the model machining mode, the MPU 12a reads T-code data in step 102 and outputs the MFIN signal in step 103. The MPU 12a starts a first clock counter (not shown) in step 104 and then in step 105, ascertains whether a second clock counter (not shown) has been started or not. These first and second clock counters may be provided in the RAM 12d to count clock signals from the aforementioned clock signal generation circuit 12b.

At the early stage of the model machining operation, the second counter has not been started, and the actual machining load value ML detected by the A-D converter 17 does not exceed the threshold value LS which can be arbitrarily set by the operator. Such are ascertained in steps 105 and 106, and thus, steps 107-109 are then executed, wherein each time the first clock counter increments its content, the load value ML from the A-D converter 17 is read and stored in one of the files CDF1-CDF99 designated by the T-code data which has been read in step 102. Return is then made to step 106, whereby plural road values ML which are smaller than the threshold value LS are gathered by the repetition of steps 107-109.

With the progress of the model machining operation, the load value ML exceeds the threshold value LS, which causes the second clock counter to be started in step 110. Each time the second clock counter increments its content, such is ascertained in step 111, and if it is ascertained in step 112 that the NCU 10 has not read the M56 code data, the MPU 12a reads the load value ML in step 113 to store it in the designated file in step 114. Subsequently, return is made to step 105, which is followed by step 115 since the second clock counter has already been started in step 110. Thus, unless the cutting tool is disengaged from the workpiece W (i.e., while the load value ML is larger than the threshold value LS), step 115 is followed by step 111, whereby steps 113 and 114 are repeatedly executed to gather the load values ML each larger than the threshold value LS.

When it is confirmed in step 115 that the load value ML has become smaller than the threshold value LS or in step 112 that the NCU 10 has read the M56 code data, the MPU 12a terminates the count operations of the first and second clock counters in step 116 and outputs the "MFIN" signal. Thereafter, the MPU 12a makes itself ready until it receives the M55 code data again.

The MPU 12a executes the AC operation routine shown in FIG. 11 in the AC machining mode. Upon receiving the M55 code data in the AC machining mode, the MPU 12a reads the T-code data in step 202, reads out the sampled load values from the load value file designated by the read T-code in step 203 and outputs the "MFIN" code signal in the same manner as described in the first embodiment. In the second embodiment, step 205 then follows to ascertain whether the second clock counter has been started or not. Since it has not been started yet at the early stage of the AC machining mode, step 206 is next executed to wait until the load value ML exceeds the threshold value LS.

With progress of the AC machining operation, the load value ML becomes larger than the threshold value LS. When such is confirmed, the second clock counter is started in step 207. Thus, each time the second clock counter is incremented thereafter, step 210 is reached through step 209. In this step 210, those steps 68-74 as described in connection with the first embodiment are executed, whereby the feed rate of the cutting tool is modulated to make the detected load value ML follow one of the sampled load values which have been read out in step 203. It is to be noted that one sampled load value read out in this step (i.e., step 68 in FIG. 7) is one that first exceeds the threshold value LS. Return is then made to step 205, wherein the second clock counter at this time is confirmed to have been started. Thus, step 211 is next reached, which is then followed by step 208 unless the detected load ML has become smaller than the threshold value LS. Consequently, steps 210 is repeatedly executed, whereby the feed rate of the cutting tool is modulated to make the detected load value ML follow the sampled load value which was sampled at the time expired from the time when the load value ML first exceeded the threshold value LS.

When it is confirmed in step 211 that the detected load value ML has become smaller that the threshold value LS or in step 209 that the M56 code has been output from the NCU 10, steps 212 and 213 are executed to stop the count operation of the second clock counter and to output the "MFIN" code signal, so that one AC machining operation is discontinued.

As clearly understood, in the second embodiment, the feed rate modulation begins when the detected load value ML first exceeds the threshold value LS. Thus, if the threshold value LS is lowered compared to that set in the model machining operation, the feed rate modulation can be performed from an earlier stage of the AC machining operation than in the model machining operation. This advantageously permits the operator to chose different threshold values LS in the model and AC machining operations.

Obviously, numerous modifications and variations of the present invention are possible in light of the above teachings. It is therefore to be understood that within the scope of the appended claims, the present invention may be practiced otherwise than as specifically described herein.

What is claimed is:

1. An adaptive control apparatus for a machine tool having feed means for effecting relative movement between a tool carrier and a work table, said adaptive control apparatus comprising:

a load detector for detecting a machining load acting on at least one of said tool carrier and said work table;

data input means for inputting information which identifies the kinds of a tool to be used and a machining operation to be performed in a model machining operation;

load value storage control means including plural storage files for respectively storing plural groups of load values sampled in plural model machining operations using a single tool, in connection with the kinds of said tool and machining operation input by said data input means;

selection means for identifying the kinds of a tool to be used and a machining operation to be performed in accordance with a numerical control program during an adaptive control machining operation, so as to select from said plural storage files one storage file which corresponds to the identified tool and the identified kind of said machining operation;

objective load read-out means for successively reading out from said one storage file selected by said selection means sampled load values in synchronous relation with the progress of said adaptive control machining operation; and feed rate control means for controlling the feed rate in the relative movement of said tool carrier and said work table so as to make the machining load detected by said load detector follow the sampled load values successively read out by said objective load read-out means.

2. An adaptive control apparatus for a machine tool having a work table, a tool carrier, feed means for effecting relative movement between said work table and said tool carrier, and numerical control means for controlling said feed means in accordance with a numerical control program, said adaptive control apparatus comprising:

load detection means for detecting a machining load acting on one of said work table and said tool carrier during each of a model machining operation and an adaptive control machining operation;

data input means for inputting information designating a tool to be used and the kind of a machining operation to be performed in said model machining operation;

a plurality of load storage areas provided for at least one of tools used in said machine tool;

load value storage control means for storing in one of said load storage areas load values detected by said load detection means during a first model machining operation using said at least one of said tools, in connection with the kinds of said at least one tool and said first model machining operation and for storing in another of said load storage areas load values detected by said load detection means during a second model machining operation using said at least one tool, in connection with the kinds of said at least one tool and said second model machining operation;

data selection means for selecting one of said load storage areas in accordance with tool data output from said numerical control means in an adaptive control machining operation;

data read-out means for successively reading out said load values from said selected one of said load storage areas during said adaptive control machining operation; and feed rate control means for controlling the feed rate of the relative movement between said work table and said tool carrier, so as to cause the machining load detected by said machining load detection means to follow the load values successively read out by said data read-out means.

3. An adaptive control apparatus as set forth in claim 2, further comprising:

clock signal generation means for generating a train of clock signals;

said load value storage control means being responsive to said clock signals from said clock signal generation means for storing said load values synchronously with said clock signals; and said data read-out means being responsive to said clock signals from said clock signal generation means for reading out said load values synchronously with said clock signals.

4. An adaptive control apparatus as set forth in claim 3, wherein said load value storage control means comprises:

first storage control means for successively storing the load values each of which is smaller than a threshold value; and second storage control means for successively storing the load values each of which is larger than said threshold value; and wherein said load value read-out means comprises:

ascertaining means for ascertaining whether said load value detected by said load detection means in said adaptive control machining operation exceeds said threshold value; and read-out execution means for reading out said load values after said load value detected by said load detection means in said adaptive control machining operation becomes larger than said threshold value.

* * * * *